United States Patent Office 2,850,046
Patented Sept. 2, 1958

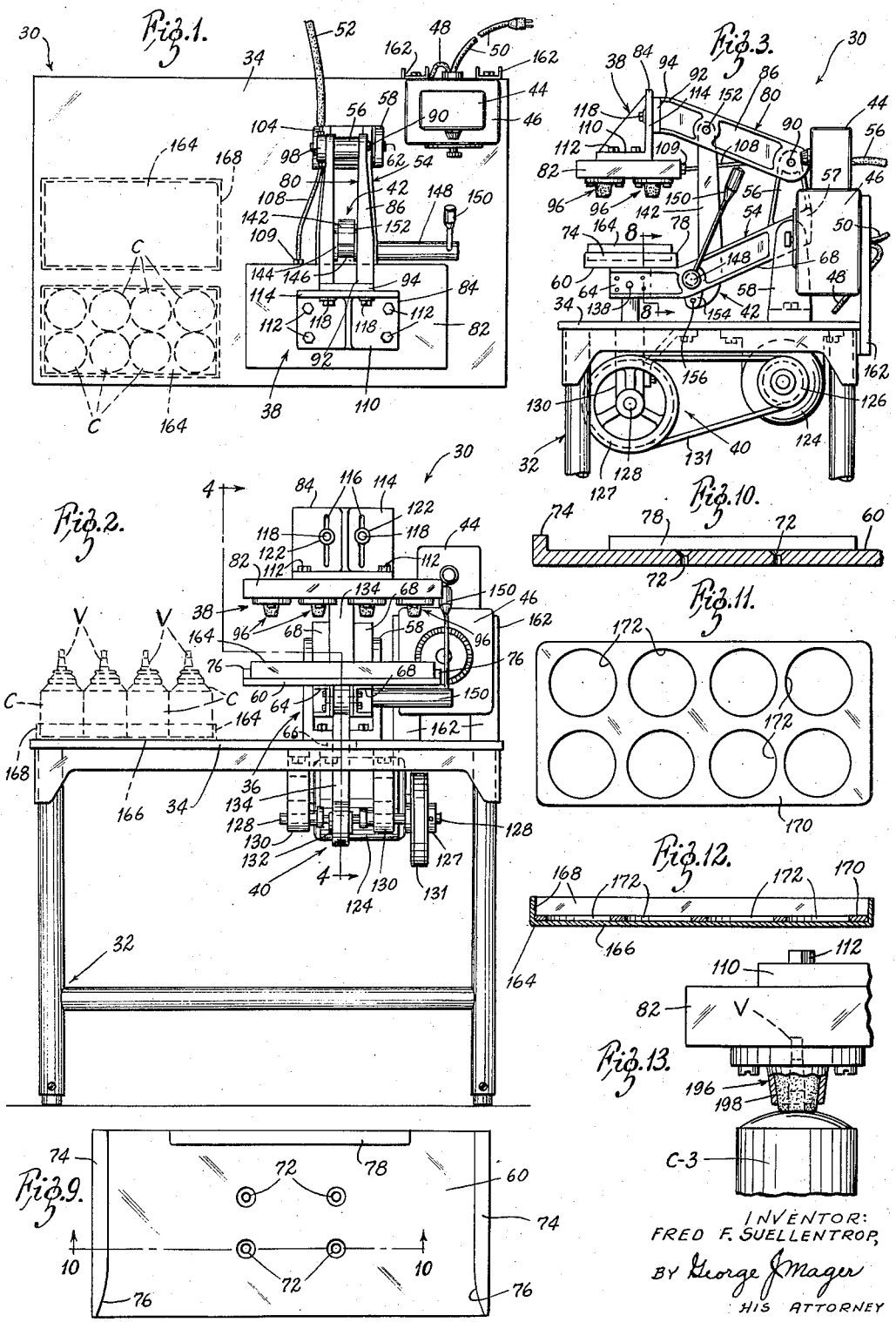

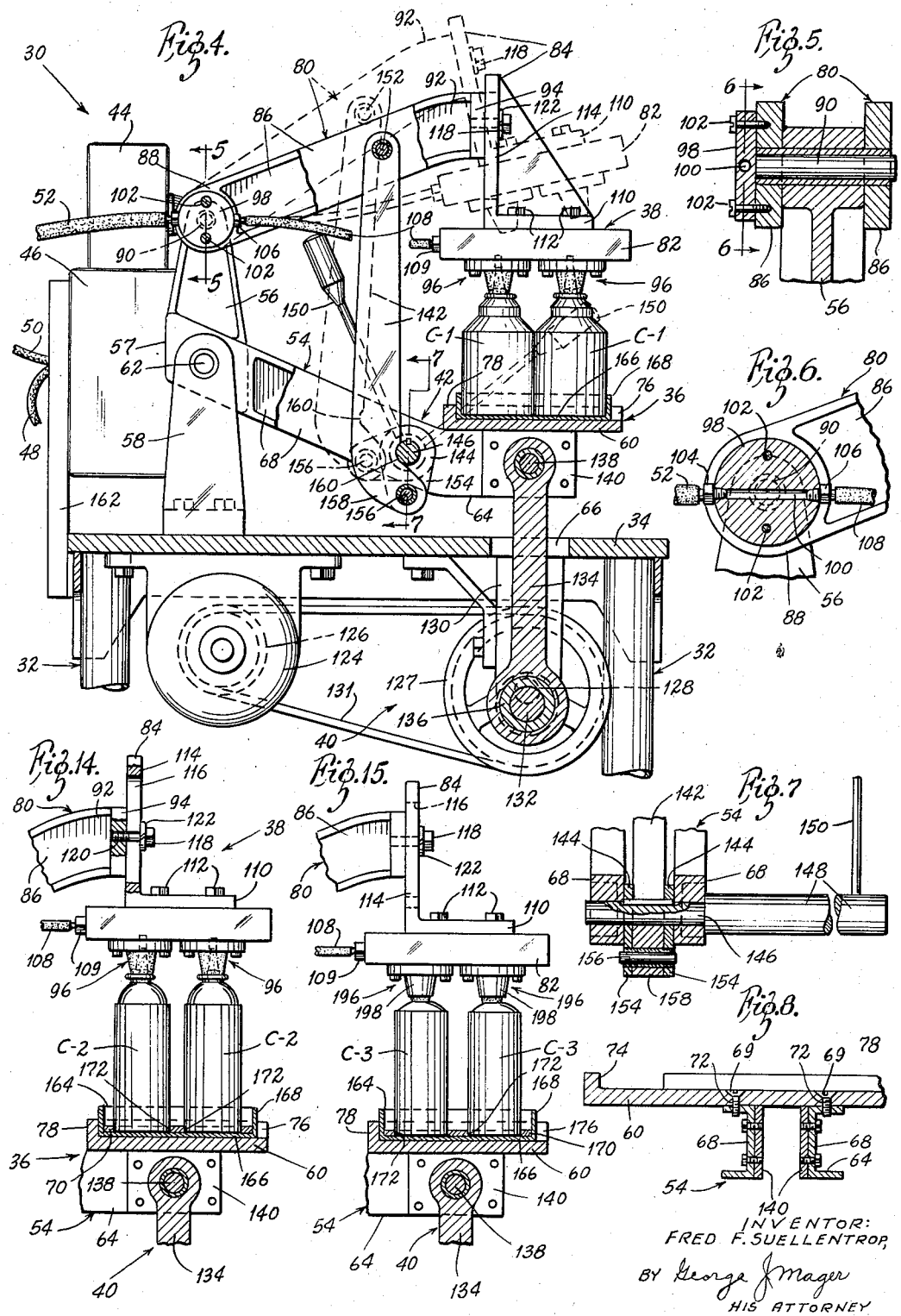

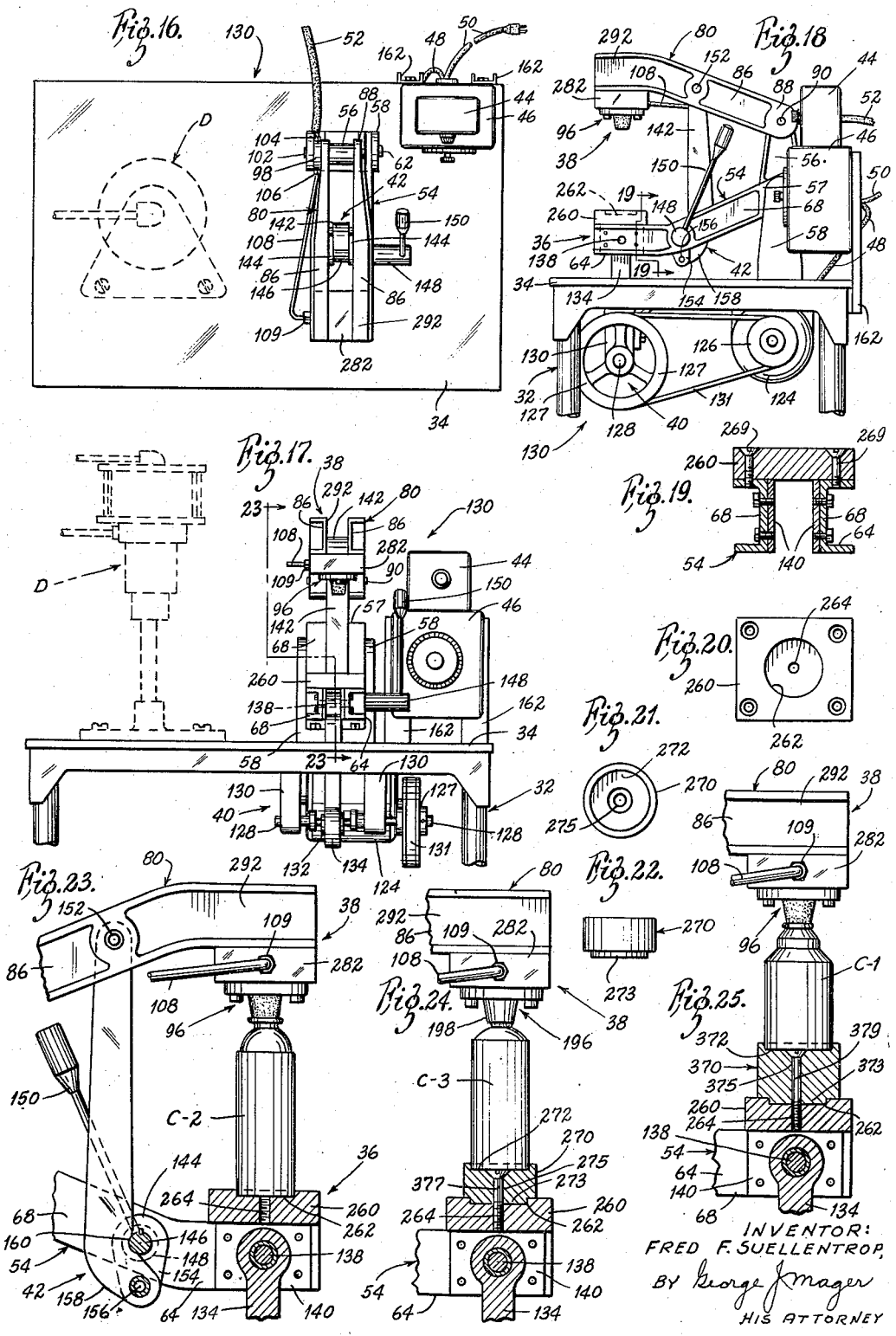

2,850,046

APPARATUS FOR MANUFACTURING WHIPPED CREAM

Fred F. Suellentrop, Mehlville, Mo., assignor to Lemay Machine Company, Lemay, Mo., a corporation of Missouri Application April 29, 1957, Serial No. 655,790

6 Claims. (Cl. 141—64)

The present invention relates generally to the manufacture of aerated products of the kind sold to the public in handy self-dispensing containers.

More particularly stated, this invention pertains to apparatus for agitating a determined quantity of pasteurized cream that had been introduced into and sealed within a self-dispensing container, simultaneously with the introduction into the container of a gas under specified pressure.

In practice, the pasteurized cream would be introduced into the container at a temperature of approximately 38 degrees. Thereupon, a dispensing valve assembly of the type disclosed in my copending application Serial No. 595,268, filed July 19, 1956, and in my copending application Serial No. 623,929 filed December 12, 1956, would be incorporated in a closure member applied to the upper end of the container.

As is well understood in the art, such valve assemblies are initially mounted in an appropriate closure member for the container, and are subsequently properly affixed to the upper end of the container by a device known as a crimper.

After the dispensing valve incorporating closure member has been applied thereto, the container is subjected to agitation for thirty seconds at a reciprocatory rate of approximately 280 cycles per minute, simultaneously with the introduction into the container of a gas mixture comprising approximately 85 percent nitrous oxide and 15 percent carbon dioxide at 90 pounds pressure.

A detailed description of the method under consideration is set forth in United States Letters Patent No. 2,584,063 granted to me on January 29, 1952, said patent also disclosing an apparatus employed in practicing the method. Improvements in the said apparatus are disclosed in Letters Patent No. 2,594,492 granted jointly to Norman J. Pfeiffer and me on April 29, 1952; Letters Patent No. 2,683,558 granted to me on July 13, 1954; and Letters Patent No. 2,695,123 granted to me on November 23, 1954.

The present invention contemplates no change in the method set forth in the earliest of said patents and referred to in those patents granted subsequent thereto. Attention is directed to the fact that all of the patents enumerated deal with a particularly contoured container. It has come to pass, however, that the container manufacturing industry has somewhat recently evolved, and is now producing, containers having configurations at variance with those exhibited in said patents, albeit also continuing the fabrication in large quantities of containers identical to those illustrated in the patents aforesaid.

One of the primary objectives of the present invention, therefore, is to provide an apparatus of the character under consideration that includes means whereby containers of different heights and having different diameters may be processed as heretofore.

To this end, the invention provides a plurality of adapter members that may be employed to compensate for differences in the heights and in the diameters of at least three containers that are being manufactured at the present time.

Further, this invention provides a novel gas injection manifold arrangement that may be readily adjusted with respect to said differently contoured containers, without requiring any but minor changes in the principal components of the apparatus, wherefore the provision of said adjustable means is another objective contemplated on one embodiment of the invention disclosed.

It is another object of the present invention to provide a laboratory embodiment thereof for use in experimentation with respect to containers of non-corresponding configurations, and with respect to the aeration of products other than whipped cream.

Another object of the invention is to provide improved means for supplying gas under pressure to the injection manifold of the apparatus, as will appear.

Additional objects and features of my invention not specifically recited hereinbefore, will be apparent or referred to hereinafter, either in the course of the description below, or in the explanation of the operation with respect to the two embodiments of the invention herein disclosed.

My invention is illustrated on three sheets of drawings that accompany this specification, and a more comprehensive understanding of the features and advantages thereof may be had from the detailed description to follow with reference to said drawings wherein:

Figure 1 is a view in top plan of an apparatus adapted to simultaneously process a plurality of pasteurized cream containers in accordance with the concepts of the present invention;

Figure 2 is a front elevational view of said apparatus;

Figure 3 is a right end elevational view thereof, the lower portion of the supporting structure being broken away;

Figure 4 is an enlarged partly elevational and partly sectional view taken generally along the line 4—4 of Figure 2;

Figure 5 is an enlarged fragmentary vertical sectional view taken on the line 5—5 of Figure 4;

Figure 6 is a vertical sectional view taken on the line 6—6 of Figure 5;

Figure 7 is a fragmentary vertical sectional view taken on the line 7—7 of Figure 4;

Figure 8 is an enlarged fragmentary vertical sectional view taken on the line 8—8 of Figure 3, a tray appearing in Figure 3 being omitted;

Figure 9 is an enlarged view in top plan of the container supporting bed plate incorporated in the Figures 1 through 15 embodiment of the present invention, said plate being fashioned to readily receive, support, and insure the proper positioning of trays wherein containers had been loaded;

Figure 10 is a vertical sectional view taken on the line 10—10 of Figure 9;

Figure 11 is an enlarged plan view of a typical novel adapter plate that is readily insertable into a tray for the proper spacing of smaller diametered containers than those so spaced automatically in consequence of their placement in such tray without the employment of an adapter plate;

Figure 12 is a longitudinal vertical sectional view of a container supporting tray demonstrating the Figure 11 adapter plate disposed therein, said plate being shown in section also;

Figure 13 is an enlarged fragmentary view, partly in section, of a gas-injection manifold equipped with a nozzle assembly designed for a particular type of container;

Figure 14 is a fragmentary view similar to Figure 4, demonstrating the disposition of certain elements of the apparatus for processing containers having a different configuration than the containers appearing in said Figure 4;

Figure 15 is a view similar to Figure 14, demonstrating the disposition of certain elements of the apparatus for processing containers having a different configuration than the containers appearing in said Figures 4 and 14;

Figure 16 is a view in top plan, of a slightly modified apparatus incorporating the principles of the present invention, this embodiment being adapted to process but one pasteurized cream or other ingredient container at a time;

Figure 17 is a front elevational view of the Figure 16 apparatus, the lower portion of the supporting structure being broken away;

Figure 18 is a right end elevational view of the Figure 16 apparatus, the lower portion of the supporting structure also being broken away;

Figure 19 is an enlarged fragmentary vertical sectional view taken on the line 19—19 of Figure 18;

Figure 20 is an enlarged view in top plan of a container-supporting bed plate incorporated in the Figures 16 through 25 embodiment of the present invention;

Figure 21 is a top plan view of a typical container-supporting adapter element that may be mounted on the Figure 20 bed plate;

Figure 22 is a side elevational view of said adapter element;

Figure 23 is an enlarged fragmentary view, partly in elevation and partly in section taken on the line 23—23 of Figure 17, demonstrating a typical tall container in position for processing the contents thereof;

Figure 24 is a view similar to Figure 23, demonstrating a typical shorter container in position for processing the contents thereof; and Figure 25 is a view similar to Figures 23 and 24, demonstrating a well known type of container in position for processing the contents thereof.

The apparatus and parts associated therewith for simultaneously processing a plurality of containers are illustrated in Figures 1 through 15 of the drawings.

In Figures 1 through 4, said apparatus is designated as a whole by the reference numeral 30. It includes: a supporting frame 32 that is surmounted by a rectangular base plate 34; a reciprocable container-supporting mechanism generally indicated 36; an adjustably mounted gas injection unit, also reciprocable and generally designated 38; a motor driven agitation assembly generally designated 40; a manually operable locking mechanism 42; a switch 44 associated with a timer 46; wiring 48 connecting the switch-timer and motor of the agitation assembly; a chord 50 for connecting the switch to a source of electrical energy; a flexible conduit 52 leading from a source of supply to deliver gas under pressure to the injection unit; and other parts and elements to be described.

The reciprocable container-supporting mechanism 36 is generally analogous to corresponding mechanisms disclosed in some of said patents enumerated, for example in Patent No. 2,695,123. Said mechanism includes an arm 54 having an upward extension 56 rigid with the rear end portion 57 thereof, a U-shaped bearing bracket 58 mounted adjacent the rear edge of the base plate 34, and a bed plate 60, shown removed in Figure 9.

The rear end portion 57 of the arm 54 and the lower end portion of the extension 56 are rotatably supported between the legs of the bearing bracket 58 on a horizontally disposed pivot pin 62, and the forward free end portion 64 of the arm is normally disposed horizontally above a rectangular opening 66 in the base plate 34, as best seen in Figure 4.

As particularly shown in Figure 8, the arm 54 is a composite one comprised of a pair of horizontally spaced similar channel-shaped members 68, and the bed plate 60 is mounted on the free end portion 64 of said arm by means of countersunk screws 69. To this end, as demonstrated also in Figures 9 and 10, the bed plate 60 has formed therein appropriately spaced countersunk openings 72, that register with similarly spaced threaded openings in the channel-shaped members.

Integrally formed with the bed plate 60 along each side marginal edge thereof, is an upstanding guide rail 74 that flares outwardly at 76 near the front edge of said plate as shown. Integrally formed with the bed plate 60 along a portion of the rear marginal edge thereof, is an upstanding abutment rail 78. The purpose of said rails will appear hereinafter.

The gas injection unit 38 includes an arm 80, a gas injection manifold 82, and a bracket 84 wherewith said manifold is adjustably supported above the bed plate 60.

The arm 80, similarly to the arm 54, is a composite one comprised of a pair of horizontally spaced channel-shaped members designated 86, and the rear end portion 88 of said arm is rotatably supported on a horizontally disposed pivot pin 90 that extends also through the upper end portion of the extension 56, as best seen in Figure 5. The free end portion 92 of the arm 80 is normally horizontally disposed, and as shown in Figures 1, 3, and 4, terminates in a mounting plate 94 rigidly secured across the contiguous end faces of the arm members 86.

The manifold 82 forms per se, no part of the present invention, wherefore it is not considered necessary to illustrate and describe it in detail. Its construction and operation are fully disclosed in Patent No. 2,594,492. Gas under pressure of approximately ninety pounds per square inch is delivered to the manifold 82, and thence to the containers via injection nozzle assemblies. The manifold illustrated in the Figures 1 through 15 embodiment of the invention carries a plurality of eight appropriately spaced nozzle assemblies that are generally designated 96.

With attention directed particularly to Figures 4, 5 and 6, it will be observed that the present invention provides a novel arrangement for supplying gas to the manifold 82. Heretofore, a flexible conduit similar to the conduit 52 was employed to deliver gas directly to the manifold. Consequently, inasmuch as the reciprocal action of the apparatus is extremely rapid, resultant behavior of the supply conduit has heretofore sometimes given trouble, as should be understood.

In order to eliminate such disadvantage in the present apparatus, an intermediate manifold has been provided. This manifold is preferably in the form of a relatively thick disc 98 having a diametrical passageway 100 extending therethrough, and is secured to the bossed rear end portion of one of the channel-shaped members 86 of the arm 80 by means of screws 102. Preferably as shown particularly in Figure 6, the passageway 100 is disposed horizontally, and suitable fittings 104 and 106 are threaded into the opposite ends thereof. The delivery end of the conduit 52 communicates with the fitting 104, and a relatively short conduit 108 leads from the fitting 106 to the manifold intake fitting 109.

Inasmuch as will appear, the arm 80 and the manifold 82 reciprocate in unison, it should thus be obvious that the disposition of the conduit 108 remains constant relatively thereto at all times. It should further be apparent that with this arrangement, all danger of the supply conduit 52 coming into contact with any of the moving parts will be obviated.

In accordance with the concepts of the present invention, the manifold 82 is mounted for vertical adjustments so that containers of different heights may be processed. To this end, the bracket 84 is angular, and includes a horizontal leg section 110 to which the manifold 82 is secured as by bolts 112, and a perpendicular leg section 114 provided with a pair of elongated vertical slots 116, as seen to best advantage in Figures 2 and 14. A bolt 118 extends through each slot 116, and engages in a threaded aperture 120 provided therefor in the bracket mounting plate 94. Preferably as shown, lock washers 122 are interposed about the shanks of said bolts between the front face of the bracket section 114 and the heads of said bolts.

The assembly 40 includes: an electric motor 124 rigidly affixed to the underside of the base plate 34; a pulley 126 fixed to the motor shaft; a larger pulley 127 fixed to one end of a horizontal shaft 128 that is supported in spaced bearings 130; a drive belt 131 operatively connecting said pulleys; an eccentric section 132 intermediate the ends of the shaft 128 extending through a circular opening in the lower end portion of a connecting rod 134; a bearing sleeve 136 about the eccentric section 132; and a wrist pin 138 extending through a bearing sleeve in the upper end portion of said connecting rod, the ends of said pin being pressfitted into circular openings provided therefor in the spaced channel-shaped members 68 at the free forward end portion 64 of the arm 54.

As most clearly seen in Figure 4, the connecting rod 134 extends freely through the opening 66 of the base plate 34, and with reference also to Figure 8, spaced wear plates 140 are provided for the upper end of said rod.

The locking mechanism 42 is generally similar to that disclosed in some of the patents hereinbefore listed, except that instead of being pneumatically operable, the present mechanism is manually operable. Further, the present mechanism incorporates a more positive lock feature as will appear.

Said locking mechanism 42 includes a vertically disposed lever 142, a pair of horizontally spaced links 144, a rock shaft 146 integral with a larger diametered laterally projecting extension 148 thereof, and an operating handle 150 that is rigid with said extension. The upper end of lever 142 has a pivot pin connection 152 with the arm 80 intermediate the ends thereof. As best seen in Figure 7, the links 144 are keyed to the rock shaft 146 for rotation therewith, and the depending free end 154 of each link has a pivot pin connection 156 with the forwardly angularly offset lower end portion 158 of the lever 142. The channel members 68 are bossed about the ends of the rock shaft 146, and a lock notch 160 is formed in the forward face of the lever 142 as shown.

The switch 44 and the timer 46 associated therewith are of conventional design, and the assembly is supported above the base plate from the upper portions of a pair of channel brackets 162 as shown, or in any other suitable manner.

As hereinbefore observed, the apparatus 30 is designed for processing containers of different heights and diameters in consequence of the adjustability of the manifold 82, and a tray plus an adapter plate insertable thereinto as will appear.

In the illustrated status of the apparatus 30, the manifold adjustment is predicated on the dimensions of the best known self-dispensing containers of the type under consideration, being the containers designated C in the patents aforesaid and likewise in some of the drawings accompanying this specification.

Numeral 164 designates a tray designed to support therein eight of the containers C, inasmuch as the manifold 82 of the apparatus 30 is provided with eight gas injection nozzle assemblies 96. It is noted that the base plate 34 is in effect a table top facilitating loading of the trays 164 with containers C, as suggested by broken lines in Figures 1 and 2. The trays 164 are dimensioned so that the eight containers C placed therein will have their dispensing valve assemblies, designated V, disposed in correspondence with the eight nozzle assemblies 96, when a loaded tray 164 is manually positioned onto the bed plate 60, as will be explained in the description of operation to appear below.

As shown particularly in Figures 1, 4 and 12, the trays 164 include a flat bottom wall 166, and an upstanding peripheral wall 168. The trays 164 are similar to those disclosed in my said Patent No. 2,584,063.

Illustrated in Figure 11, is a plan view of an adapter plate 170 provided with eight circular openings 172. The adapter plate 170 is dimensioned for ready insertion into a tray 164 as demonstrated in Figure 12. The circular openings 172 are diametered to snugly receive containers of lesser diameter than the containers C, and are spaced so that their dispensing valve assemblies V will automatically register with the injection nozzle assemblies 96 thereabove when the tray 164 is positioned on the bed plate 60.

Illustrated fragmentarily in Figure 13, is a manifold 82 equipped with slightly modified nozzle assemblies, one such assembly being shown and designated 196. The assembly 196 is similar in every respect to the nozzle assemblies 96 except that a depending metallic band 198 is provided to surround the depending rubber skirt portion of the assembly.

Operation

In explaining the operation of the Figures 1 through 15 embodiment of the invention, it will first be assumed that containers C of the configuration shown in Figures 1, 2 and 4 are to be processed. Accordingly, the timer 46 would be set to produce the prescribed number of reciprocations, and with the switch 44 off, the chord 50 would be connected to an electrical outlet. With the handle 150 in the broken line disposition thereof shown in Figure 4, the arm 80 would be in raised status as also indicated in broken lines, thus conditioning the apparatus 30 for a loading operation.

The operator would now place eight containers C in a tray 164 resting on the base plate 34, as suggested in broken lines in Figure 1, whereupon the loaded tray would be slid into place on the bed plate 60. The flared forward portions 76 of the guide rails 74 facilitate this operation, and the abutment rail 78 insures proper positioning of the tray as should be apparent. (For comparative purposes hereinafter, the containers appearing in Figure 4 are designated C-1.)

With the loaded tray thus in position, the operator would manipulate the handle 150 rearwardly, from the broken to the full line position thereof shown in Figure 4. In consequence of such handle movement, the rock shaft 146 and the links 144 rigid therewith would rotate counterclockwise, thus bringing the gas injection assembly 38 into proper disposition relatively to the containers C-1, and in effect releasably clamping them between the manifold 82 and the bed plate 60, the resulting status being maintained by the engagement of the rock shaft 146 in the lock notch 160.

The operator would now turn on the switch 44, whereupon an agitation cycle would be initiated and terminated, the duration thereof being automatically controlled by the timer 46.

It is not believed necessary to explain the agitation operation in detail, inasmuch as it is explained at length in the patents aforesaid. Suffice it to say that when the switch 44 is turned on, the motor 124 will be energized, whereby to drive the shaft 128 via the pulley and belt connections. As the shaft 128 revolves, the eccentric section 132 thereof reciprocates the connecting rod 134, thus agitating the containers in the manner set forth in said patents.

The timer is of the reset type, so that an agitation cycle terminates automatically in accordance with the timer setting, and a repetition of the cycle may be produced each time the operator manipulates the switch.

Following completion of an agitation cycle, the operator would pull the handle 150 forwardly to the broken line position, thus elevating the gas injection assembly 38 for easy removal of the tray 164 with its processed containers C-1.

It will be apparent of course, that during the processing cycle of one container loaded tray, a second tray 164 will have been loaded with other containers C-1 ready for placement and a repetition of the cycle immediately following removal of the first tray.

It will now be assumed that it were desired to process containers of the configuration shown in Figure 14 and designated C-2. Containers of this type are known as "full dome" containers in the art, and as a comparison will demonstrate, the C-2 type containers are considerably taller and have a smaller diameter than the C-1 containers.

To condition the apparatus 30 for processing C-2 type containers, the bolts 118 would be loosened slightly, whereupon the bracket 84 would be raised to bring the manifold 82 to the proper height, and thereupon said bolts would be retightened. Adapter plates 170 would be inserted into the trays 164 as demonstrated in Figure 12, whereupon said trays would be loaded with containers C-2 and slid into place on the bed plate 60. Thereupon the handle 150 would be swung rearwardly, and the procedure previously described would be followed, the setting of timer 46 having of course been adjusted to provide the appropriate agitation cycle.

It will now be assumed that it were desired to process containers of the configuration shown in Figure 15 and designated C-3. Containers of this type are known in the art as "crown" containers. As a comparison will demonstrate, the C-3 type containers, though taller and having a smaller diameter than the C-1 type, are not as tall as containers of the C-2 type.

To condition the apparatus 30 for processing containers C-3, a manifold 82 equipped with the slightly modified nozzle assemblies 196 would be attached to the bracket 84, whereupon said bracket would be adjusted in the manner described to the position thereof demonstrated in Figure 15. Attention is again directed to Figure 13, where the upper portion of a C-3 type container appears. Inasmuch as the closure members in this type of containers are arcuate, it will be observed that the depending metallic band 198 preserves the shape of the rubber skirt portion of the nozzle assembly during operational actions of the apparatus, and thus insures the requisite seal about the valve assembly V for the positive injection into a container C-3 of the gas under specific pressure, as should be understood.

The apparatus designated as a whole by the numeral 130, and the parts associated therewith for processing a single container, and for experimental purposes with respect to such processing, are illustrated in Figures 16 through 25. Generally, the apparatus 130 is similar to the apparatus 30, wherefor parts and elements that are identical have the same reference characters applied thereto, but will not be described in detail.

In this embodiment of the invention, the bed plate designated 260 has formed therein a circular depression 262, adapted to snugly receive the bottom portion of a C-2 type container. Centrally thereof, said bed plate has formed a threaded opening 264, and as shown in Figure 19, it is securely in place by screws 269 in a manner similar to the bed plate 60. Further, the gas injection manifold 282 carries but a single nozzle assembly, and is permanently secured to the underside of the free end portion 292 of the arm 80, it being observed that said arm portion 292 extends forwardly a greater distance than the corresponding arm portion 92 of the earlier described apparatus embodiment of the invention.

Shown per se in Figures 21 and 22, is an adapted element 270 having a circular depression 272 formed in its upper face, a circular boss 273 depending from its lower face, and a countersunk opening 275 formed centrally thereof. The depression 272 of the adapter is sized to receive and snugly embrace the lower end portion of a C-3 type container, and the depending boss 273 thereof is sized for ready insertion into the depression 262 of the bed plate 260.

Shown in vertical section in Figure 25, is an analogous adapter element 370 having a circular depression 372 formed in its upper face, a circular boss 373 depending from its lower face, and a countersunk opening 375 formed centrally thereof. The depression 372 is sized to receive and snugly embrace the lower end portion of a C-1 type container, and the depending boss 373 is a duplicate of the boss 273. A screw 377 shown in Figure 24, and a longer screw 379 appearing in Figure 25 are associated respectively with the adapter elements 270 and 370.

*Operation*

The apparatus 130, although it may be employed in a processing capacity, is primarily designed for experimental use in a laboratory and the like. When thus employed, a pneumatically operable crimping device would be mounted on the base plate surface whereon the trays 164 would be loaded in the production apparatus embodiment 30 of the invention. Thus, a typical crimping device D is merely suggested by broken lines in Figures 16 and 17, inasmuch as such device constitutes no part of the present invention. In other words, references is had thereto herein solely to demonstrate the advantages of the apparatus 130 from an experimental standpoint.

Thus, whereas in production properly filled containers in quantities are supplied to the operator with the valve assembly V incorporating closure members already crimped in place, experimentations would be made in more leisurely fashion. That is to say, tests could be made following the introduction of different amounts of cream or other ingredients into the various containers, thereupon applying previously assembled valve incorporating closure members by means of the crimping device, and thereafter subjecting the containers separately to the action of the apparatus under varying adjustments of the timer 46, gas pressures, and so on as should be understood.

With attention directed to Figure 23, it will be observed that with the apparatus 130 in loading disposition (corresponding to that illustrated by broken lines in Figure 4), a container of the C-2 type would simply be positioned with the lower end portion thereof resting in the circular depression 262, whereupon the handle 150 would be manipulated to its rearward position, thus to lower the manifold 282 and releasably clamp said container between the bed plate 260 and said manifold 282, in the manner now deemed to be obvious.

Assuming that a container of the C-3 type and its contents were to be subjected to experimental tests, the adapter 270 would first be mounted on the bed plate 260 as illustrated in Figure 24, with the screw 377 extending through the opening 275 to engage the threaded opening 264 of said bed plate. It is of course understood, that as in the case of the production apparatus 30, a gas injection manifold 282 equipped with an injection nozzle assembly 196 would be employed with respect to C-3 containers.

Again, assuming that a container of the C-1 type were to be employed in an experimental test, the adapter 370 would first be mounted on the bed plate 260 as illustrated in Figure 25, with the screw 379 extending through the opening 375 to engage the threaded opening 264 of said bed plate.

The foregoing description augmented by the comprehensive drawings, is believed to present an adequate disclosure of the present invention. All of the principal parts excepting the drive mechanism, the timer and switch are fabricated of aluminum or of stainless steel material. The provision of the adapters whereby either embodiment of the invention may be employed with respect to at least three differently contoured and sized containers is considered to be an innovation in the art under consideration.

It is to be understood, however, that whereas the description refers primarily to the manufacture of whipped cream, the invention is not limited to such production, nor to the use of any specific gasses, pressures, or ingredients, particularly in the laboratory embodiment thereof.

In other words, the invention contemplates use thereof in the manufacture of any and all products that may be processed and sold in self-dispensing containers.

What I claim is:

1. In apparatus for reciprocating containers partially filled with a liquid ingredient simultaneously with the injection thereinto of a gas under predetermined pressure, the combination of container-supporting mechanism that includes: a rotatably supported arm; a bed plate rigidly mounted on the free end portion of said arm; a rectangular tray having a bottom wall and an upstanding peripheral wall; an adapter plate dimensioned correspondingly with the inner periphery of said wall insertable into said tray; spaced circular openings in the adapter plate each diametered to snugly embrace the lower end portion of a container resting on the bottom wall of the tray; and a pair of upstanding guide rails along the side marginal edges thereof and an abutment rail along the rear marginal edge thereof providing for the proper disposition of said tray on said bed plate, the forward portions of said guide rails being flared outwardly whereby to facilitate the dispositioning of said tray onto said plate; and a gas injection unit including a manifold provided with means for vertical adjustments thereof with respect to the upper end portions of containers resting on the bottom wall of the tray.

2. In apparatus of the character and for the purpose described, said apparatus including a reciprocably mounted arm that has a normally horizontally disposed free end portion: a mounting plate constituting the extremity of the free end portion of said arm; a pair of horizontally spaced threaded apertures in said plate; an angular bracket member including a horizontal leg section and a perpendicular leg section; a gas injection manifold secured to the lower surface thereof and suspended from the horizontal leg section; a pair of horizontally spaced elongated vertical slots provided in the perpendicular leg section, said slots being in alignment with the threaded apertures aforesaid; a bolt extending through each slot to engage one of said threaded apertures whereby the disposition of the bracket and thus the manifold may be varied with respect to the mounting plate; and lock washers interposed about the shanks of said bolts between the adjacent face of the perpendicular leg section and the heads of the bolts whereby said bracket may be releasably locked in the selected disposition thereof.

3. In apparatus of the character and for the purpose described, said apparatus including a reciprocable arm pivotally mounted at one end and suspending a main gas injection manifold from its opposite free end: means for supplying gas under pressure from a remote source to the main manifold comprising in combination: an intermediate manifold in the form of a relatively thick disc secured to the pivotally mounted end of said arm; a diametrical passageway extending through the disc and terminating at its ends in a forward and a rearward threaded portion; a first fitting engaging the forward threaded portion of said passageway; a relatively short conduit connecting said first fitting with the main manifold intake fitting; a second fitting engaging the rearward threaded portion of said passageway; and a delivery conduit connecting said second fitting with a source of gas supply.

4. In apparatus for reciprocating containers partially filled with a liquid ingredient simultaneously with the injection thereinto of a gas under predetermined pressure, the combination of: a frame surmounted by a rectangular base plate; container-supporting mechanism and a gas injection unit reciprocably mounted on the base plate; manually operable mechanism for releasably locking containers in position between the container-supporting mechanism and the gas injection unit aforesaid; a motor driven agitation assembly for reciprocating the supporting mechanism and injection unit concurrently; and a timer for controlling said motor to automatically regulate the length of agitation cycles; said container-supporting mechanism including a pivotally mounted reciprocable arm, a bed plate rigid with the normally horizontally disposed free end of said arm, a circular depression formed in the upper face of the bed plate, a threaded vertical opening extending centrally therethrough from the bottom surface of the depression therein to the bottom surface of said bed plate, an adapter element having a depending circular boss seated in the similar depression aforesaid of the bed plate, a circular depression sized to snugly embrace the lower end portion of a container placed therein formed in the upper face of the adapter element, a countersunk vertical opening extending centrally therethrough from the bottom surface of the depression therein to the bottom surface of said adapter element, and a countersunk-headed screw extending through the vertical opening of the adapter element into engagement with the threaded opening of the bed plate.

5. The combination set forth in claim 4 wherein the diameter of the circular depression formed in the upper face of the adapter element corresponds to the diameter of the similar depression formed in the upper face of the bed plate.

6. The combination set forth in claim 4 wherein the diameter of the circular depression formed in the upper face of the adapter element is greater than the diameter of the circular depression formed in the upper face of the bed plate.

References Cited in the file of this patent

UNITED STATES PATENTS

| | | |
|---|---|---|
| 846,169 | Valerius | Mar. 5, 1907 |
| 2,695,123 | Suellentrop | Nov. 23, 1954 |